United States Patent [19]

Dittrich et al.

[11] 3,812,298

[45] May 21, 1974

[54] COMMUNICATION SYSTEM SWITCHING NETWORK

[75] Inventors: Robert George Dittrich, Boulder; Dean Brian Secord, Westminster; Louis Emanuel Thelemaque, Boulder, all of Colo.

[73] Assignee: Bell Telephone Laboratories, Incorporated, Murray Hill, N.J.

[22] Filed: Oct. 6, 1972

[21] Appl. No.: 295,671

[52] U.S. Cl. .......... 179/18 EA
[51] Int. Cl. .......... H04q 3/42
[58] Field of Search .......... 179/18 GE, 18 EA

[56] References Cited

UNITED STATES PATENTS

| | | | |
|---|---|---|---|
| 3,629,512 | 12/1971 | Yuan | 179/18 GE |
| 3,705,523 | 12/1972 | Alouisa | 179/18 EA |
| 3,729,591 | 4/1973 | Gueldenpfennig | 179/18 GE |

*Primary Examiner*—William C. Cooper
*Attorney, Agent, or Firm*—D. M. Duft

[57] ABSTRACT

A switching system is disclosed having a network controller which, in response to the receipt of a request for a network connection, simultaneously tests for the availability of an idle circuit of the type to which a connection is requested as well as the availability of idle paths through the network to the requested circuits.

11 Claims, 20 Drawing Figures

COMMUNICATION SYSTEM SWITCHING NETWORK

BACKGROUND OF THE INVENTION

1. Field of the Invention

Figures 1A, 1C:
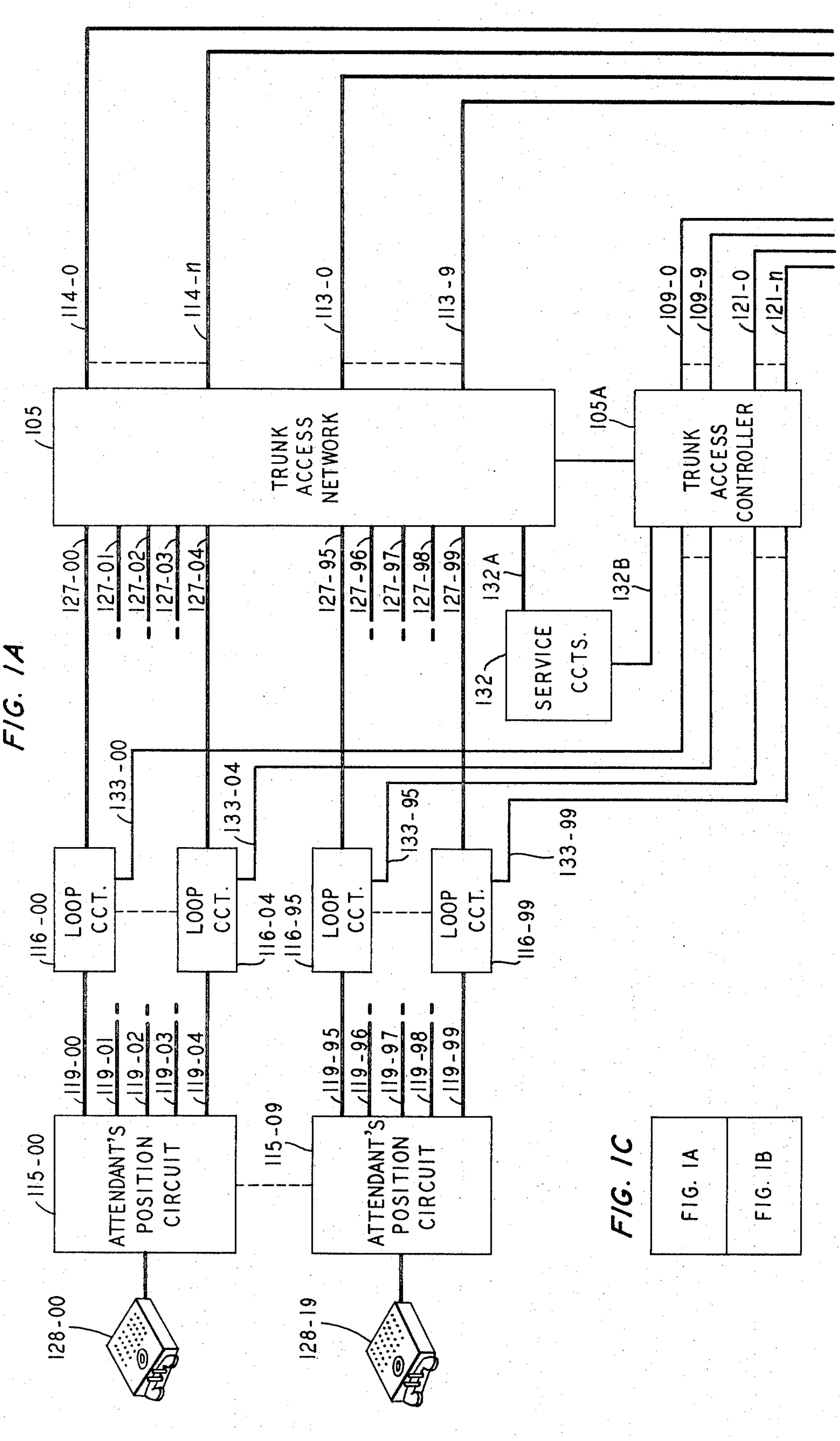

This invention relates to a switching system and, in particular, to a system having an improved controller for the switching network of the system.

This invention further relates to an improved network path hunting and control circuit for a communication switching system.

2. Description of the Prior Art

Crossbar type switching systems are known in which network connections are established by a multistep procedure in which a network controller receives a connection request signal from a circuit connected to one side of the network, hunts for and preselects an idle circuit of the type to which a connection is to be established from the requesting circuit, and then hunts for and attempts to find an idle path through the network between the requesting circuit and the preselected idle circuit. A connection is established at this time if an idle network path is found. If a path is not available, the controller recycles, hunts for and selects another idle circuit of the requested type, and then attempts to find an idle path to the newly selected circuit. This procedure may be repeated a number of times until a path is found to an idle circuit, or until all network paths to all idle circuits of the requested type have been tested and found to be busy.

This path establishment procedure is reasonably effective for large networks having three or more stages, but it is somewhat inefficient when used with certain types of two-stage networks. Each primary switch is connected to each secondary switch by only a single link in the typical two-stage network. Because of this, a high probability of blocking will be encountered in any path establishment scheme which first preselects and reserves an idle circuit of the requested type and then attempts to find an idle network path extending to it from the requesting circuit. The reason for this is that there is only a single link available between any two switches on opposite sides of the network, and this link may well be busy on a connection between other circuits served by the same switches when the new connection request is served. This high probability of blocking can require repeated recycling of the preselection circuitry and, in turn, repeated attempts by the path hunting circuitry of the controller. This could cause considerable delays in call service during busy periods of the systems in which such networks are used.

It is, therefore, apparent that it is a problem of the prior art to control the operation of certain types of crossbar type networks in a manner that is efficient and which does not cause delays in service during busy system periods.

BRIEF SUMMARY OF THE INVENTION

Objects

It is an object of the invention to provide an improved network controller.

It is a further object to provide a controller that has improved path hunting and establishment circuitry.

Summary Description

We provide a network path hunting and control circuit which overcomes the disadvantages of the prior art arrangements by simultaneously testing for idle network paths as well as for idle circuits of the type to which a connection is requested. Upon the receipt of a service request, our control circuit generates a path hunting signal, and propagates this signal forward from the requesting circuit through contacts associated with idle network paths as well as through break contacts of idle circuits of the type to which a connection is requested. Each idle circuit of the requested type receives the propagated signal if an idle network path is currently available between the requesting circuit and the idle requested circuit. The reception of a signal by each such circuit indicates that a network path is available to it from the requesting circuit. Each idle circuit extends the propagated signal it receives back to the network controller which then operates the control magnets required to establish a network connection. If a plurality of idle circuits simultaneously receive the propagated service request signal, a preference circuit in the controller determines which circuit is to be used and, in turn, operates the control magnets required to establish a path to the selected circuit.

The control circuit of our invention is inherently faster than the prior art arrangements. This is due to several reasons. First of all, our circuit simultaneously determines the availability of idle circuits of the requested type as well as the availability of idle network paths extending to these circuits. This eliminates the priorly discussed two-step procedures of the prior art arrangements. Also, our control system is faster since it requires only a minimum number of sequential relay operations to determine whether an idle circuit and a path to it are available and, in turn, to operate the required network control magnets. The reason for this is that once the service request signal is generated, it is immediately extended through network control contacts, through the idle receiving circuits, and back to the controller which immediately knows whether a circuit of the requested type and a path to it are available. If such a combination is available, the controller immediately establishes the requested network path.

FEATURES

A feature of the invention is the provision of a network path hunting and control circuit which, upon the receipt of a request for a network connection, simultaneously tests for the availability of idle circuits of the requested type as well as idle network paths extending to these circuits.

A further feature is the provision of circuitry for propagating a service request signal from a requesting circuit, through idle network paths extending to a requested circuit, and through the requested circuit to a network controller.

A further feature is the provision of circuitry for propagating a network service request signal through idle path contacts of a first network stage, over idle links extending to a second network stage, over idle path contacts of the second stage, to idle circuits of the requested type, and through contacts associated with the idle requested circuits to a network controller.

A further feature is the provision of circuitry for propagating a service request potential over idle path contacts of a first stage network switch, over idle links extending from the first stage switch to a second stage of the network, over idle path contacts of switches of the second stage to idle circuits of the requested type, and through idle state contacts of the requested circuits to the controller which then establishes the requested path under control of the propagated potential.

DRAWING

Figure 1B:
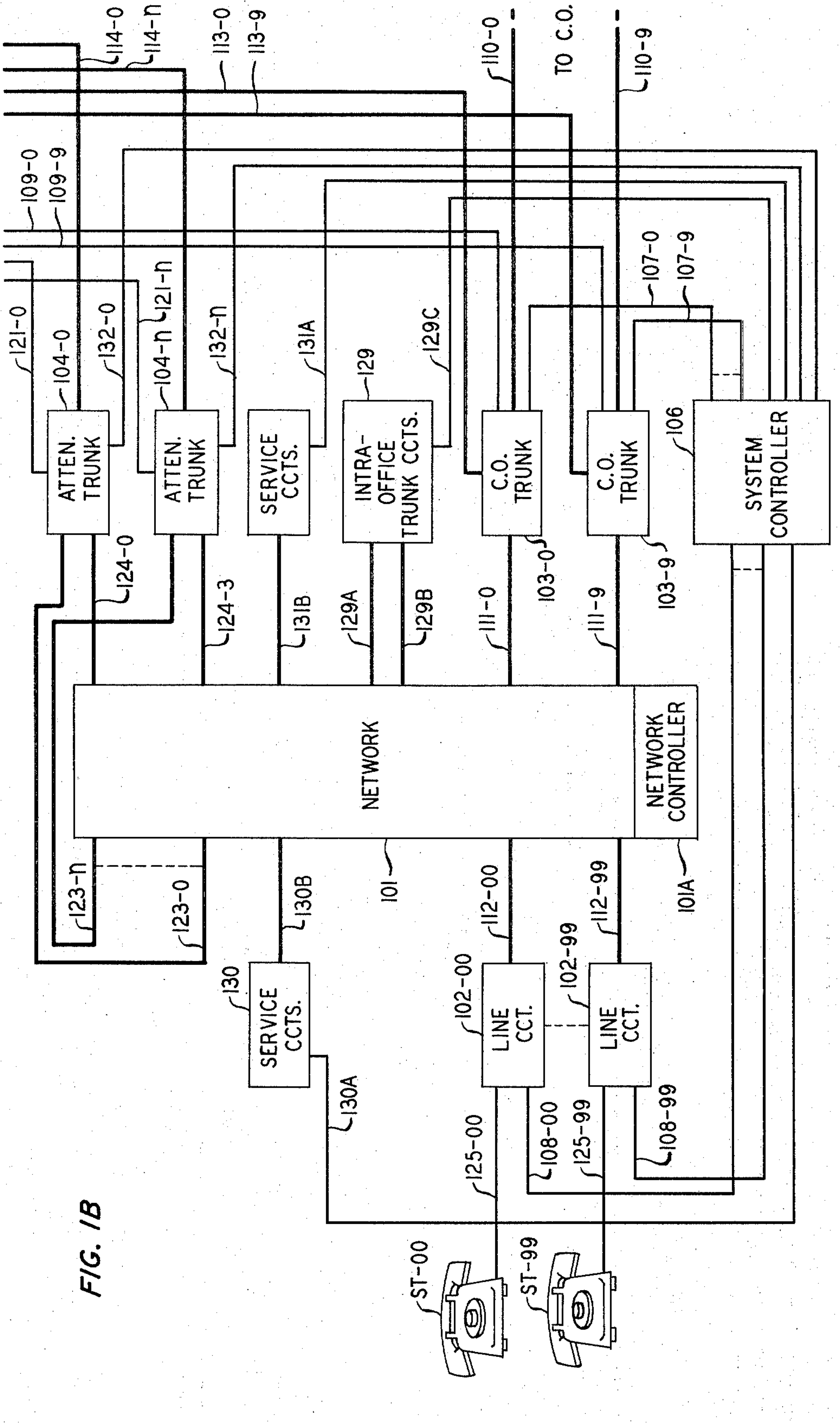

These and other objects and features of the invention will become apparent from a reading of the following description of the invention taken in conjunction with the drawing in which FIG. 1A and 1B, when arranged as shown in FIG. 1C, discloses a system that includes an illustrative embodiment of our invention;

FIG. 2A, 2B, 3A, 3B, 3C, 3D, 3E, 3G, 4, 5, 6, 7, 8A, 8B, and 8C disclose additional details of the system of FIG. 1.

GENERAL DESCRIPTION - FIG. 1A AND 1B

One possible embodiment of our invention is shown on FIG. 1A and 1B as included in a PBX having stations ST–00 through ST–99, corresponding line circuits 102–00 through 102–99, a switching network 101, central office trunk circuits 103–0 through 103–9, attendant trunk circuits 104–0 through 104–*n*, and a plurality of lines 110–0 through 110–9 each of which extends from a corresponding one of the central office trunk circuits to a central office serving the PBX. The system also includes intraoffice trunk circuits 129 (of which only one is shown), line side service circuits 130, and trunk side service circuits 131. The PBX further includes a system controller 106 which cooperates with the other elements of FIG. 1 to control the system in the performance of its call serving functions.

The system of FIG. 1 is effective to serve various types of calls including (1) intra-PBX calls between stations of the PBX, (2) outgoing calls to a central office, and (3) incoming calls from the central office. Intra-PBX calls are completed from a calling station and its line circuit, through a first path of the switching network 101, through an intraoffice trunk circuit 129, over a second path of network 101, to the called line circuit, and from there to the called station. Outgoing central office calls are extended from the calling station and its line circuit, through network 101, through an idle central office trunk circuit 103–, and over the associated line 110– to the central office. Incoming central office calls that do not require operator assistance are extended from the central office trunk circuit 103– that receives the call, through the switching network 101, to the called line via its line circuit.

The manner in which the system of FIG. 1 serves the foregoing types of calls does not comprise any part of our invention, is well-known in the art, and therefore is not described in further detail.

The system of our invention further and illustratively includes 20 operator or attendant positions 128–00 through 128–19, 20 associated attendant position circuits 115–00 through 115–19, 100 loop circuits 116–00 through 116–99 with each of the position circuits being associated with five loop circuits. The system further includes a trunk access network 105 which with the assistance of controller 105A, interconnects the loop circuits with various ones of the attendant trunk circuits 104– and the central office trunk circuits 103–. These connections are established by network 105 on calls served by the PBX that require operator assistance. On incoming central office calls that require assistance, a path is completed from the calling CO trunk circuit 103–, via the access network 105 and an idle loop circuit 116–, to the operator position selected to serve the call. On operator or attendant originated calls, a path is completed through a loop circuit and the access network 105 to one of the attendant trunk circuits 104–.

The specific services performed by the attendant after a call is extended to her position are not discussed in further detail since neither these services nor the manner in which they are performed comprise any portion of our invention. Instead, our invention relates to the manner in which the network 105 and the controller 105A function in response to the receipt of a connection request to (1) determine the availability of idle circuits of the requested type, (2) determine the availability of an idle network path between the requesting circuit and the idle requested circuit, and (3) establish a network path between the requesting circuit and the requested circuit.

As is typical of many PBXs, each position circuit 115– is associated with five loop circuits 116– such as, for example, loop circuits 116–00 through 116–04 for position 128–00 and position circuit 115–00. This permits each operator to concurrently provide service for a plurality of calls. An operator can actively serve or talk to only one call at a time. However, by means of her loops and keys individual to each loop, an operator can place an active call on hold on one of her loops and remain free to receive a call on any idle one of her loops.

On incoming central office calls that require operator assistance, the path determining circuitry of controller 105A determines which positions are idle, which loop circuits of these positions are idle, as well as whether any idle network paths are available between the calling central office trunk circuit and idle loop circuits of idle positions. After having made this determination, the controller selects one idle position circuit having an idle loop circuit to which a network path is available from the central office trunk circuit. The controller then causes the switching network to establish a connection between the calling trunk circuit and the selected loop circuit.

The network 105 and the controller 105A function in a similar manner to that just described on attendant originated connections. On these, the attendant depresses a key at her position to seize an idle one of her loop circuits. This transmits a request from the seized loop circuit to the controller. The controller determines which attendant trunk circuits are idle, whether any idle network paths are available from the requesting loop circuit to an attendant trunk circuit, selects a specific one of the idle attendant trunk circuits, and establishes a network path from the loop circuit to the selected trunk circuit.

DESCRIPTION OF FIG. 2A AND 2B

Figure 2A:
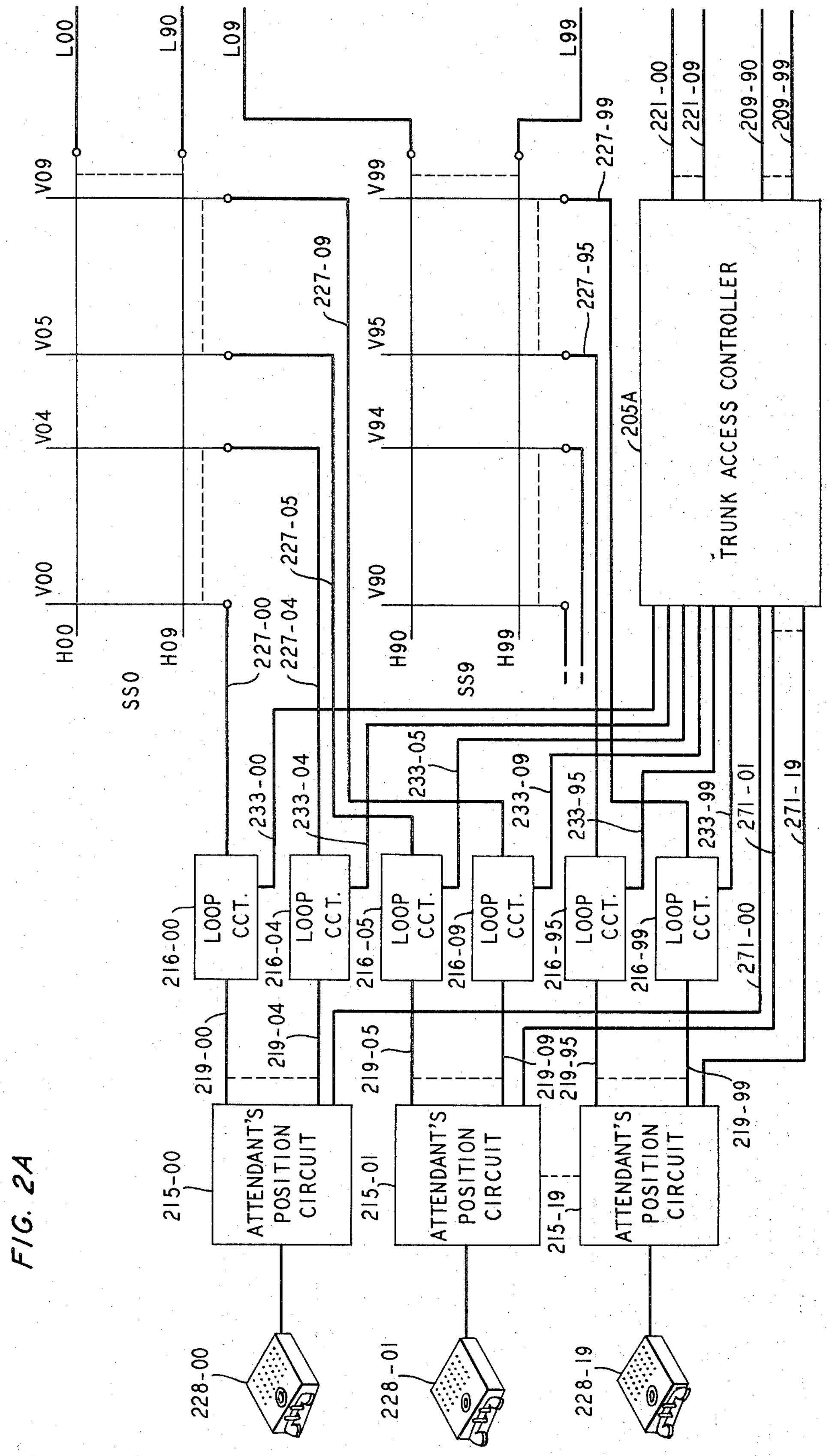
Figures 2B, 2C:
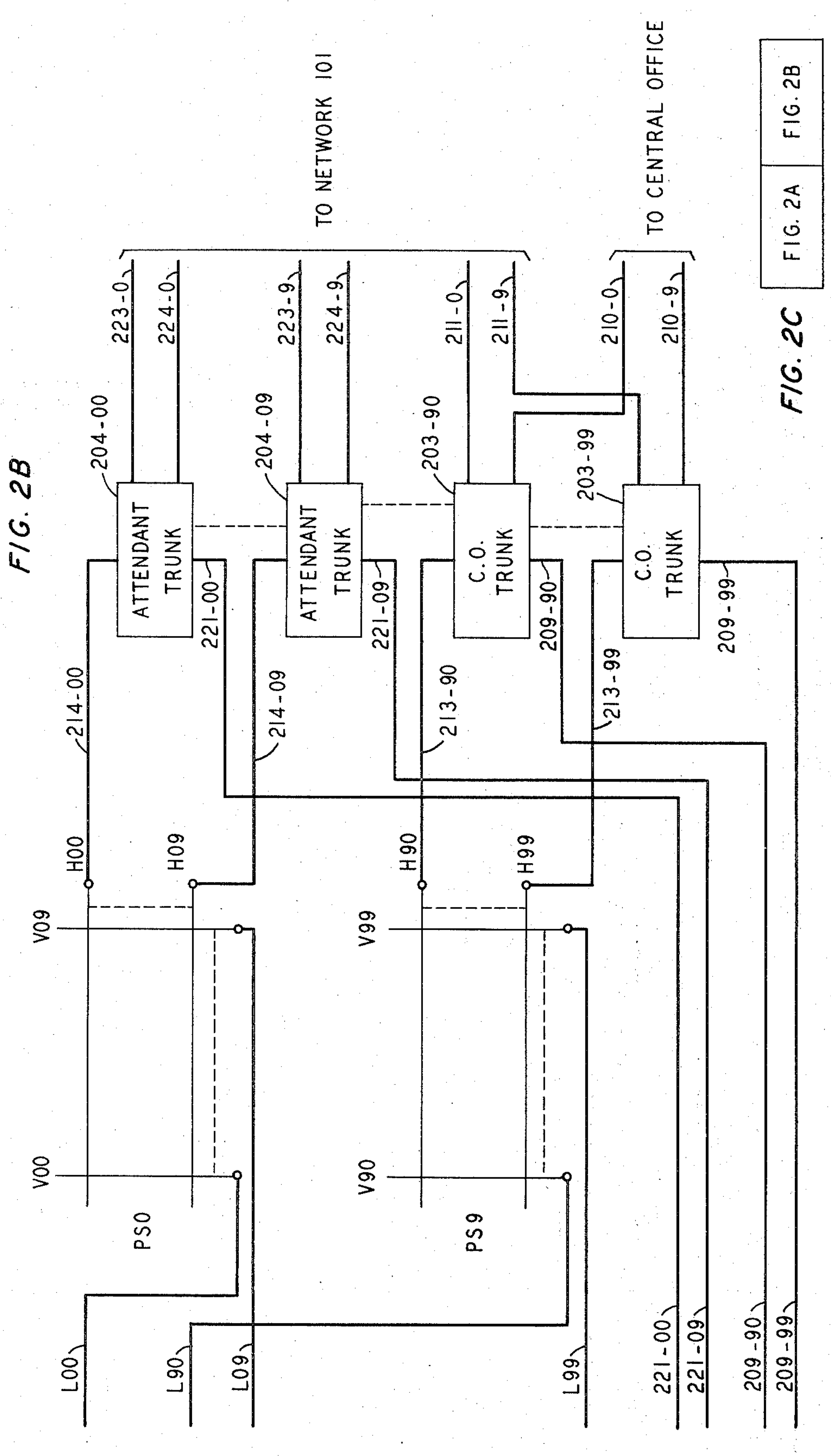

FIG. 2A and 2B, when arranged as shown in FIG. 2C, illustrate further details of the trunk access network 105, its controller 105A, as well as the manner in which the loop circuits and the trunk circuits are connected to the network. Each element on FIG. 2 that directly corresponds to an element on FIG. 1 is designated in a manner that facilitates an appreciation of the correspondence. For example, position circuit 215–00 on FIG. 2A corresponds to position circuit 115–00 on FIG. 1A.

Network 205, which corresponds to network 105 on FIG. 1A, is of the two-stage type. The right-most stage is designated the primary stage and illustratively includes 10 crossbar type primary switches with each switch having ten verticals and 10 horizontals. Similarly, the left-most stage is designated the secondary stage and it comprises ten crossbar switches each having 10 verticals and 10 horizontals. The loop circuits 216– are connected to the verticals of the secondary switches with the 10 verticals of each secondary switch serving the loop circuits of two positions. Thus, the 10 verticals of secondary switch 0 (SS0) are designated V00 through V09 and are connected to loop circuits 216–00 through 216–09, respectively, over conductors 227–00 through 227–09, respectively. The loop circuits for the remaining positions are served by the verticals of the remaining secondary switches with the ten verticals of secondary switch 9 (SS9) being connected to the loop circuits of the last two positions, namely, 215–18 and 215–19.

The horizontals of the primary switches are connected to the attendant and central office trunk circuits. The ten horizontals of primary switch 0 (PS0) are connected via conductors 214–00 through 214–09 to attendant trunk circuits 204–00 through 204–09. Similarly, the 10 horizontals of primary switch 9 (PS9) are connected via conductors 213–90 through 213–99 to CO trunk circuits 203–90 through 203–99. The horizontals of the remaining primary switches, namely, switches 1 through 8, may be connected either to other attendant trunk circuits, or to other central office trunk circuits, or to a mixture of such trunk circuits depending upon the needs and requirements of the system. The controller 205A is connected to the attendant trunk circuits by means of conductors 221– and to the central office trunk circuits by means of conductors 209–. The controller is also connected to the loop circuits by means of conductors 223– and to the positions by conductors 271–. Conductors 223–, 221–, 209–, and 271– permit the controller to communicate with and receive service requests from the loop circuits and the trunk circuits.

The suffix portion of the designation of each trunk circuit on FIG. 2 does not directly correspond to the suffix designations on FIG. 1. The reason for this is that the designations on FIG. 2 correspond to the 100 trunk side network appearances for the illustrated 10-by-10 type network. A network of this size is shown in order to simplify an understanding of the path hunting circuits shown on the subsequent figures.

It should be noted with reference to the network of FIG. 2A that the 100 horizontals (H00 through H99) of the secondary switches are connected to the one hundred verticals (V00 through V99) of the primary switches by one hundred different links L00 through L99. Each secondary switch horizontal is connected to a primary switch vertical in such a manner that the number of the primary switch vertical matches the number of the secondary switch to which the primary vertical is connected. Thus, the ten horizontals of secondary switch 0 are connected to the 0 vertical of each of the ten primary switches. The interconnection of the primary and secondary switches in this manner provides only a single path between each primary and each secondary switch. Thus, link L00 provides the only possible path between secondary switch 0 and primary switch 0. Similarly, link L90 provides the only possible path between secondary switch 0 and primary switch 9.

DESCRIPTION OF FIGS. 3A, 3B, 3C, 3D, 3E AND 3F

Figure 3A:
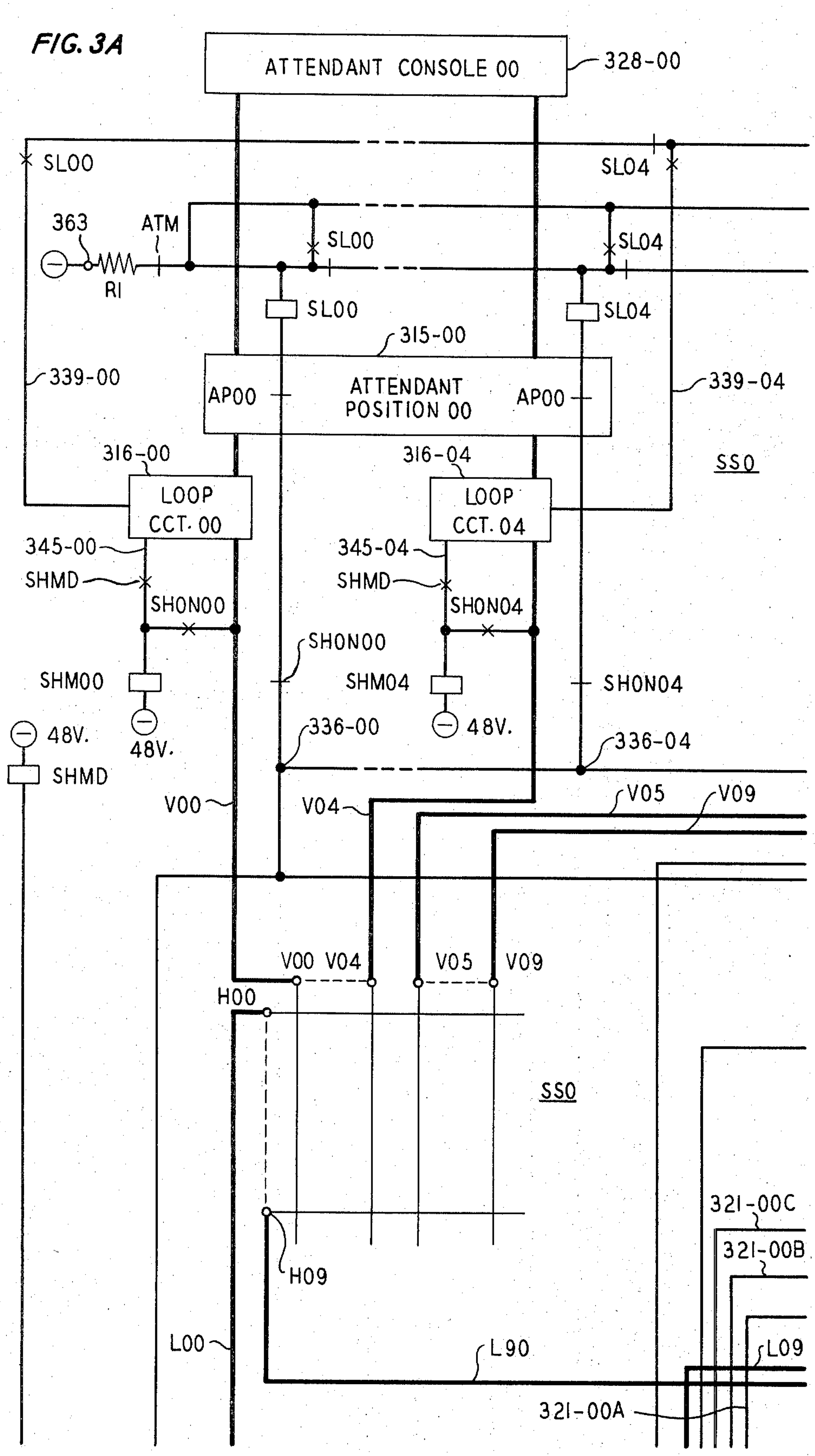
Figure 3B:
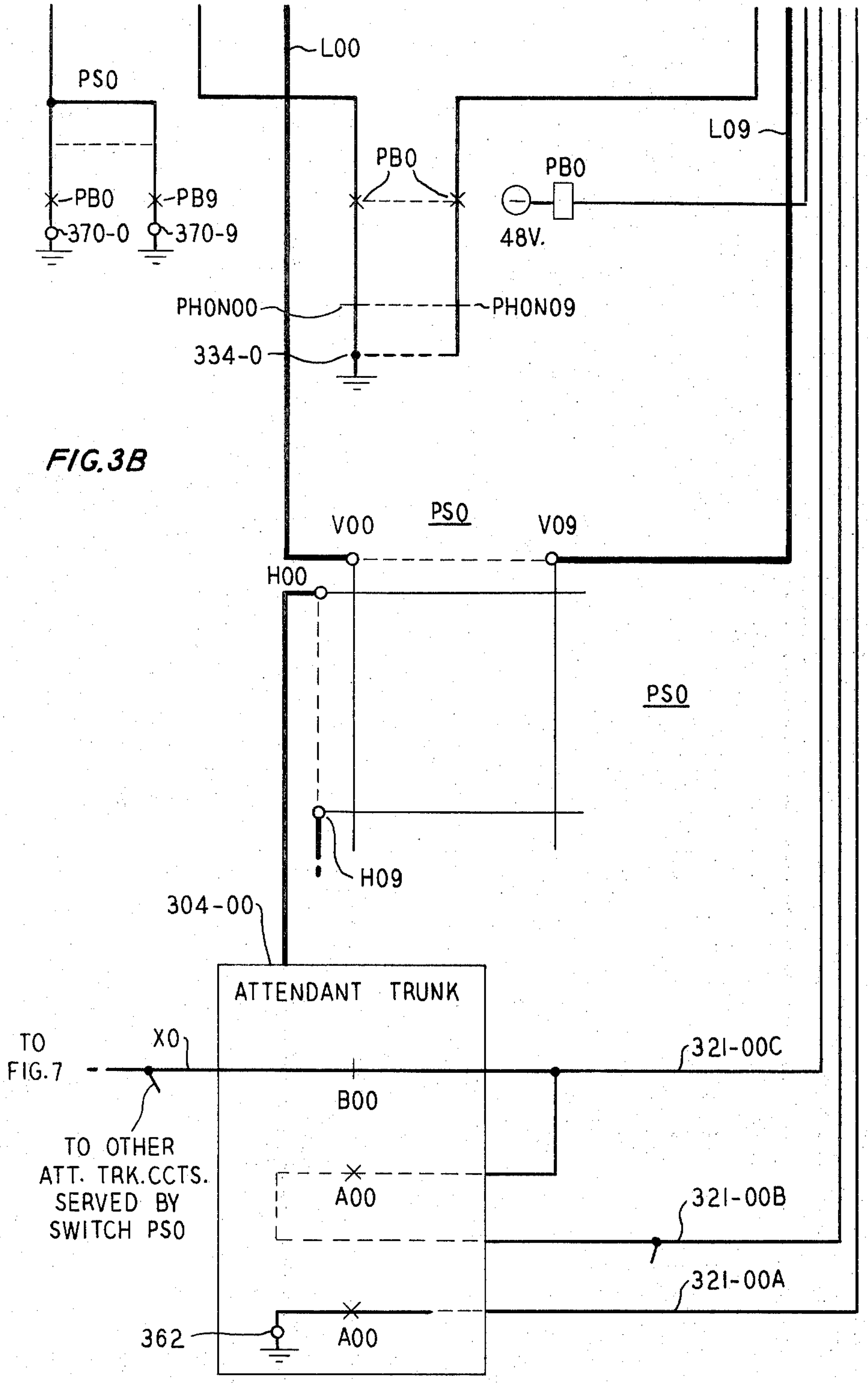
Figure 3C:
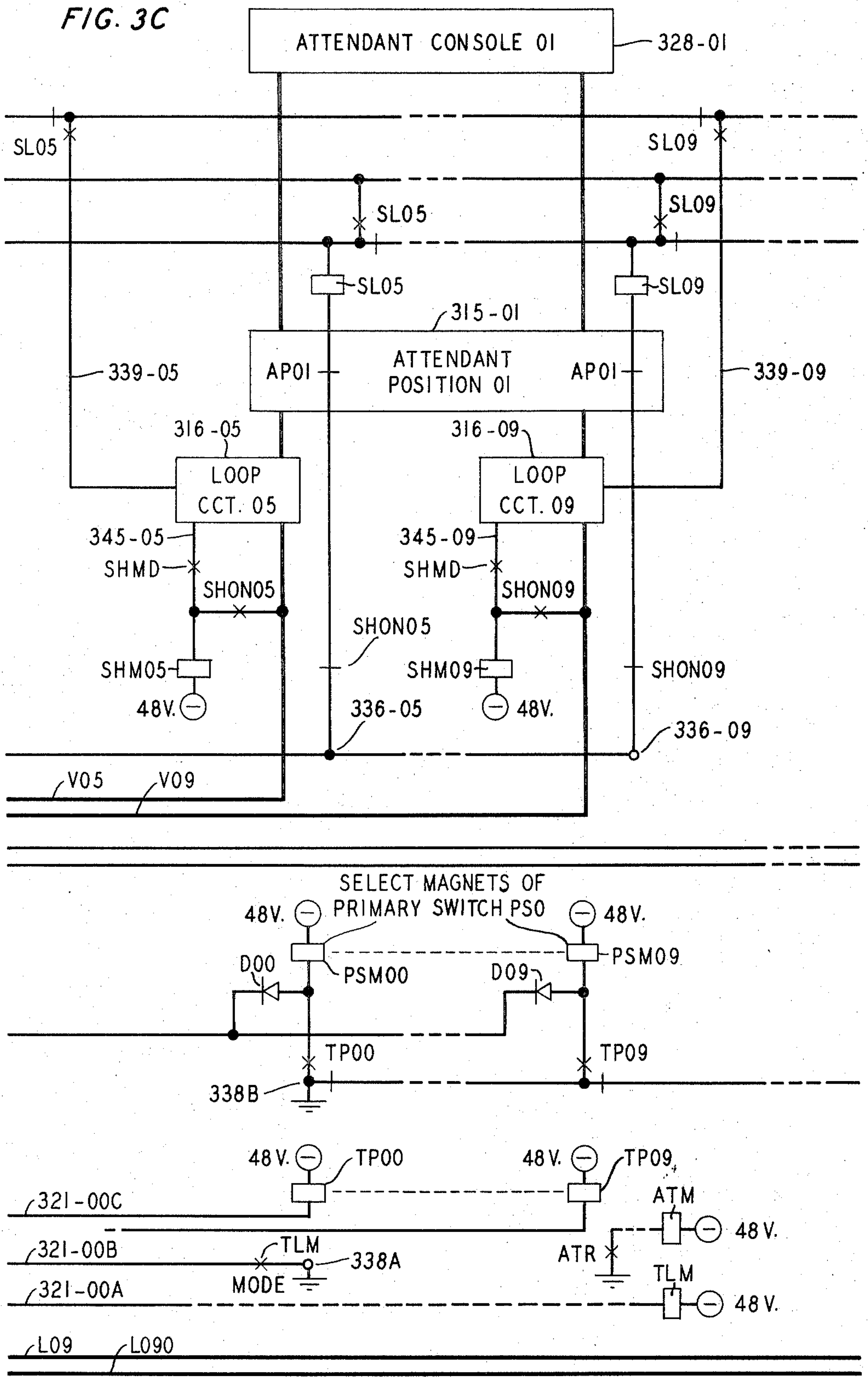
Figure 3D:
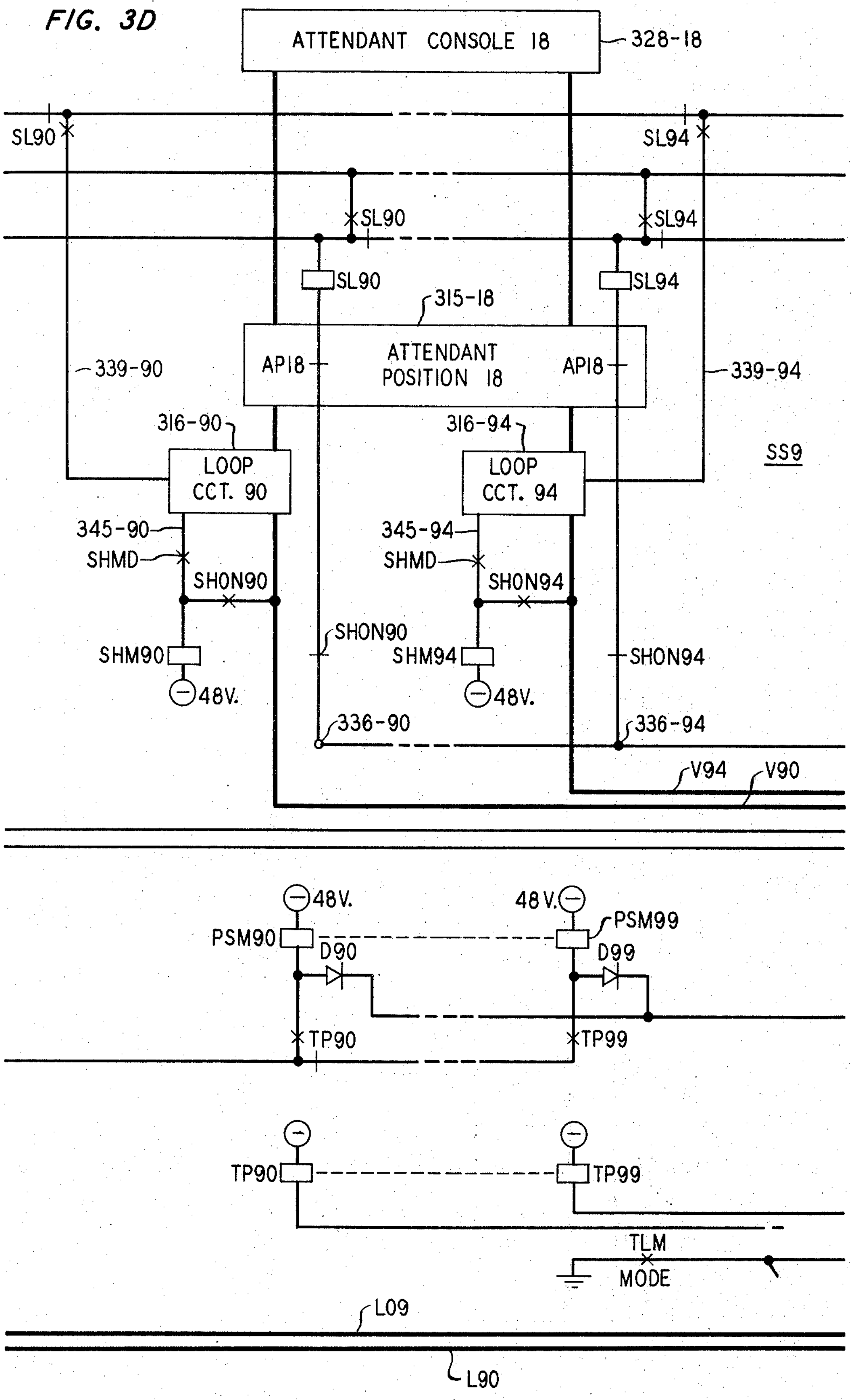
Figure 3E:
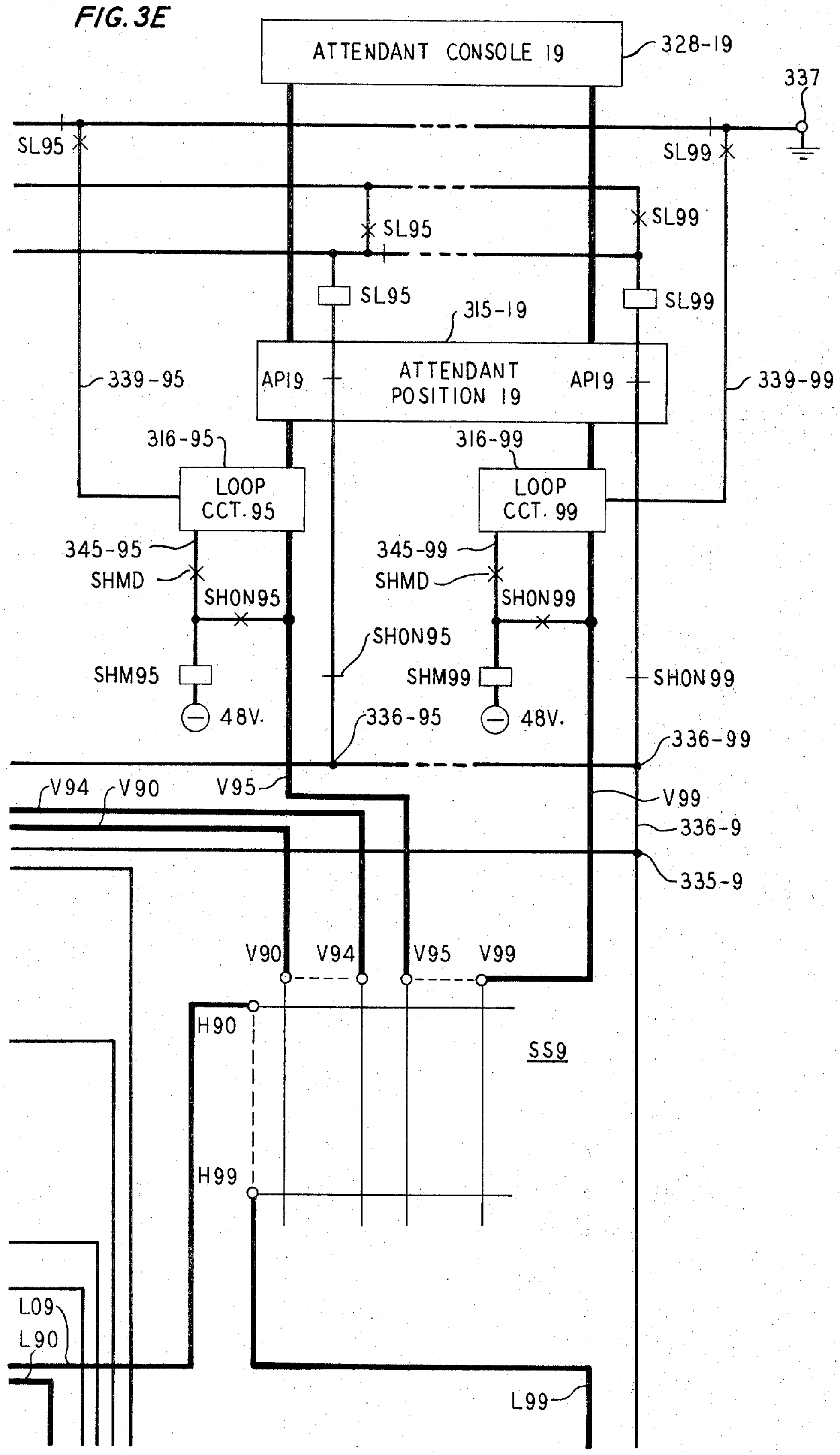
Figure 3F:
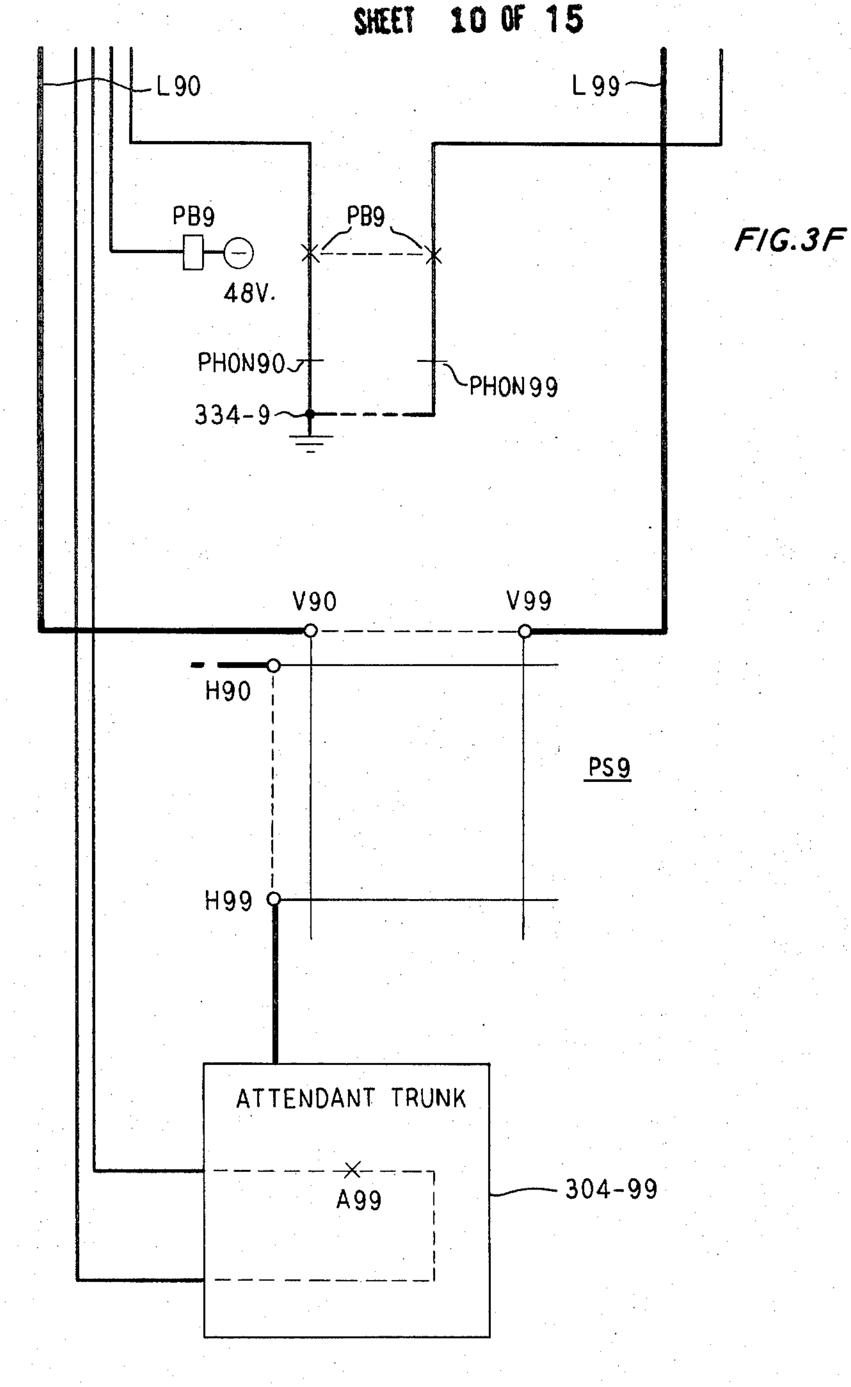
Figure 3G:
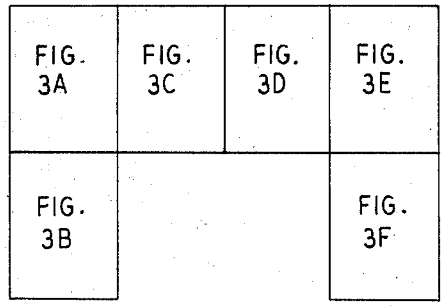

FIG. 3A to 3F when arranged as shown in FIG. 3G disclose further details of one possible embodiment of our invention. The elements on FIG. 3 are oriented in a manner that advantageously illustrates the circuitry involved in establishing a network connection to a loop circuit from a trunk circuit. The trunk circuits are shown on the bottom ones of these figures; the loop circuits, the position circuits, and the attendant consoles are shown on the top-most ones of the figures. The controller and crossbar switches, as well as the paths interconnecting the switches, are shown intermediate the trunk circuits and the consoles.

This portion of the description first describes the operation of the system during the establishment of a connection from a calling trunk circuit to an attendant position. The controller includes relays ATM and TLM on FIG. 3C and relay ATR on FIG. 8A. Relays ATM and ATR operate in response to the receipt of a service request from a loop circuit; relay TLM operates in response to the receipt of a request from a trunk circuit. Let it be assumed attendant trunk circuit 304–00 shown in the lower left-hand corner of FIG. 3A requests connection to a loop circuit. In so doing, it operates its relay A00 (whose winding is not shown) and applies a ground from terminal 362 (FIG. 3B), through make contacts A00, and over conductor 321–00A to operate relay TLM. Relay TLM closes its make contacts to extend ground from terminal 338A, over conductor 321–00B to the attendant trunk circuit, through make contacts A00, and back over conductor 321–00C to operate relay TP00 in the controller. The controller contains a series of TP– relays each of which is connected to a different one of the trunk circuits served by the controller. Each TP– relay operates when its associated trunk circuit transmits a connection request to the controller. Thus, relay TP00 operates in response to the receipt of a service request from attendant trunk circuit 00.

Immediately above the windings of the TP– relays on FIG. 3C and 3D are a set of transfer contacts unique to each such relay. Beginning with ground on terminal 338B (FIG. 3C), these transfer contacts are wired to form a preference circuit for operating the various primary switch select magnets PSM00 through PSM99. The preference circuit is necessary to insure that only one primary switch select magnet at a time will be operated in the event that service requests are received from a plurality of trunk circuits concurrently. In this preference circuit, primary select magnet PSM00 is first preferred; primary select magnet PSM99 is last preferred. The operation of relay TP00 for the presently described call closes its make contacts in this preference circuit to extend the terminal 338B ground to the winding of select magnet PSM00 to operate it. With reference to FIG. 2, attendant trunk circuit 00 is served by level 00 of primary switch 0 (PSO) and, thus, the operation of select magnet PSM00 prepares the network for establishing a connection from this trunk circuit to an idle loop circuit via link L00.

The terminal 338B ground is also extended at this time through diode D00 to the winding of relay PB0 which is unique to primary switch 0. The relay operates and closes its make contacts each of which is connected in series with the hold magnet break contacts of a different vertical of switch PS0. Thus, with the operation of relay PB0, the terminal 334–0 ground is extended through the break contacts (PHON00 . . . PHON09) of all idle hold magnets of switch PS0, through the make contacts of relay PB0, and from there upwards to the circuitry shown on the top-most ones of FIG. 3 to the path hunting and control circuitry of the secondary side of the network. In short, the operation of relay PB0 permits the terminal 334-0 ground to be propagated through the hold magnet OFF normal contacts of all idle verticals of primary switch 0 and, from there, to the path hunting and control circuitry of all secondary switches to determine which of their paths are currently idle. From an inspection of FIG. 2, it may be appreciated that only a single link connects each primary switch with each secondary switch. The terminal 334–0 ground is not propagated to a secondary switch at this time in the event that the link extending from primary switch 0 to the secondary switch is currently busy.

Let it be assumed that link L00 between primary switch 0 and secondary switch 0 is currently idle. This being the case, the terminal 334–0 ground is now extended through break contacts PHON00 of the hold magnet 0, through make contacts PB0, and upwards from there on FIG. 3A to terminals 336–00 through 336–09 each of which is unique to a different one of loop circuits 00 through 09. From an inspection of FIG. 2, it may be seen that loop circuits 00 through 04 are connected to position 00 and that loop circuits 05 through 09 are connected to position 01. Thus, the propagation of a ground to terminals 336– at this time indicates that link L00 is idle and that trunk circuit 00 may be connected to any idle one of loops 00 through 09 provided the associated position for each such loop is also idle. Each of terminals 336–00 through 336–09 is connected to the break contacts of corresponding ones of hold magnets SHON00 through SHON09 of secondary switch 0. Since the loop circuits are connected to the verticals of the secondary switches, the idle state of a hold magnet of a secondary switch indicates that its associated loop circuit is currently idle.

Each attendant position contains a break contact unique to each loop circuit. These contacts for position 00 are designated AP00. All of the AP– break contacts of a position are operated (open) when the position is busy; conversely, all such contacts are released (closed) when the position is idle and free to receive a new call.

Let it be assumed at this time that loop circuit 00 is idle; let it also be assumed that position 00 is idle and free to receive a new call. In this case, the ground on terminal 336–00 is extended through break contacts SHON00 for the hold magnet of vertical 0 of the switch 0, through break contacts AP00 of position circuit 00, to the winding of relay SL00. The other side of the winding of this relay is connected through break contacts of relay ATM and resistor R1 to negative battery on terminal 363. Relays SL00 through SL99 are connected in a preference circuit to determine the specific path that is to be used on a connection in the event that a plurality of paths are available when a request is received. It has already been described how relay SL00 operates in the event that attendant position 00 and loop 00 are idle when a path is currently available from trunk circuit 00 through primary switch 0, link L00, and secondary switch 0. Let it be assumed that a path is also available at this time through vertical V09 of switch PS0, through link L09 extending to secondary switch SS9, and from there through vertical V99 of that switch to loop circuit 99. Let it further be assumed that this loop circuit and its position 19 are also idle. In this case the terminal 334–0 ground (FIG. 3B) is extended through break contacts PHON09 for hold magnet 9 of primary switch 0, through make contacts PB0, and from there to terminal 336–99 on the right side of FIG. 3E. From there, this ground is further extended through break contacts SHON99 for hold magnet 9 of secondary switch 9, through break contacts AP19 of idle position 19 to the winding of relay SL99. The other side of this winding is connected through the preference circuit to negative battery on terminal 363 (FIG. 3A). Both of relays SL00 and SL99 now attempt to operate, but the break contacts of relay SL00 in this preference circuit open the path for relay SL99. This prevents relay SL99 from operating, permits relay SL00 to operate, and in so doing effectively selects loop circuit 00 and position 00 to serve the call.

The operation of relay SL00 closes its make contacts in the path of conductor 339–00 which extends to the left side of loop circuit 00 on FIG. 3A. These make contacts, together with the corresponding transfer contacts of the other SL– relays, form a preference circuit which terminates on the terminal 337 ground on the right side of FIG. 3E. The operation of relay SL00 opens the operating path for all other SL– relays and, thus, the terminal 337 ground is extended through the break contacts of all other SL– relays to make contacts SL00. From there, the ground is extended via conductor 339–00 to loop circuit 00. The reception of this ground by the loop circuit informs it that it has been seized for use on the call. The operation of the loop circuit is described in further detail in connection with FIG. 8. As subsequently described, loop circuit 00 operates its hold magnet SHM00 at this time.

The circuitry shown on FIG. 3, as well as that shown on the other figures, causes the required select and hold magnets to operate to establish a network path between bidding trunk circuit 00 and attendant console 00 via loop circuit 00. After this connection is established, the connection is held up by the hold magnets under control of the sleeve lead potential ground applied by the loop or trunk circuit. On FIG. 3A, hold magnet SHM00 is held over its make contacts to the sleeve lead ground of path V00. At this time, attendant trunk circuit 00 is connected via primary switch 0, link L00, and secondary switch 0 to loop circuit 00 and, in turn, to idle attendant position 00.

Subsequent portions of this description describe the details of the circuitry that operates the select and hold magnets involved on the connection.

In summary of the preceding description of FIG. 3A, the generation of a service request by a bidding trunk circuit, and its recognition by the controller, closes the PB– relay for the primary switch serving the bidding trunk circuit. The closure of this relay propagates a terminal 334– ground through the contacts associated with idle hold magnets of the primary switch, through the make contacts of the PB– relay, through contacts of idle hold magnets of secondary switches and through the remainder of the circuitry already described so that the propagated ground is extended to the lower portion of the winding of each SL– relay that is associated with an idle loop circuit for the idle attendant position to which a path currently exists from the bidding trunk circuit. Each SL– relay that receives a propagated ground attempts to operate from negative battery on terminal 363. However, the preference circuit comprising the transfer contacts of these SL– relays determines which one of the SL– relays that receives the propagated ground is to operate. The SL– relay that is most preferred operates and returns a signal to its associated loop circuit indicating that it has been selected to serve the call. The loop circuit then operates its hold magnet which, together with the operated hold magnet of the primary switch, maintains the connection for its duration as subsequently described.

DESCRIPTION OF FIG. 4

Figure 4:
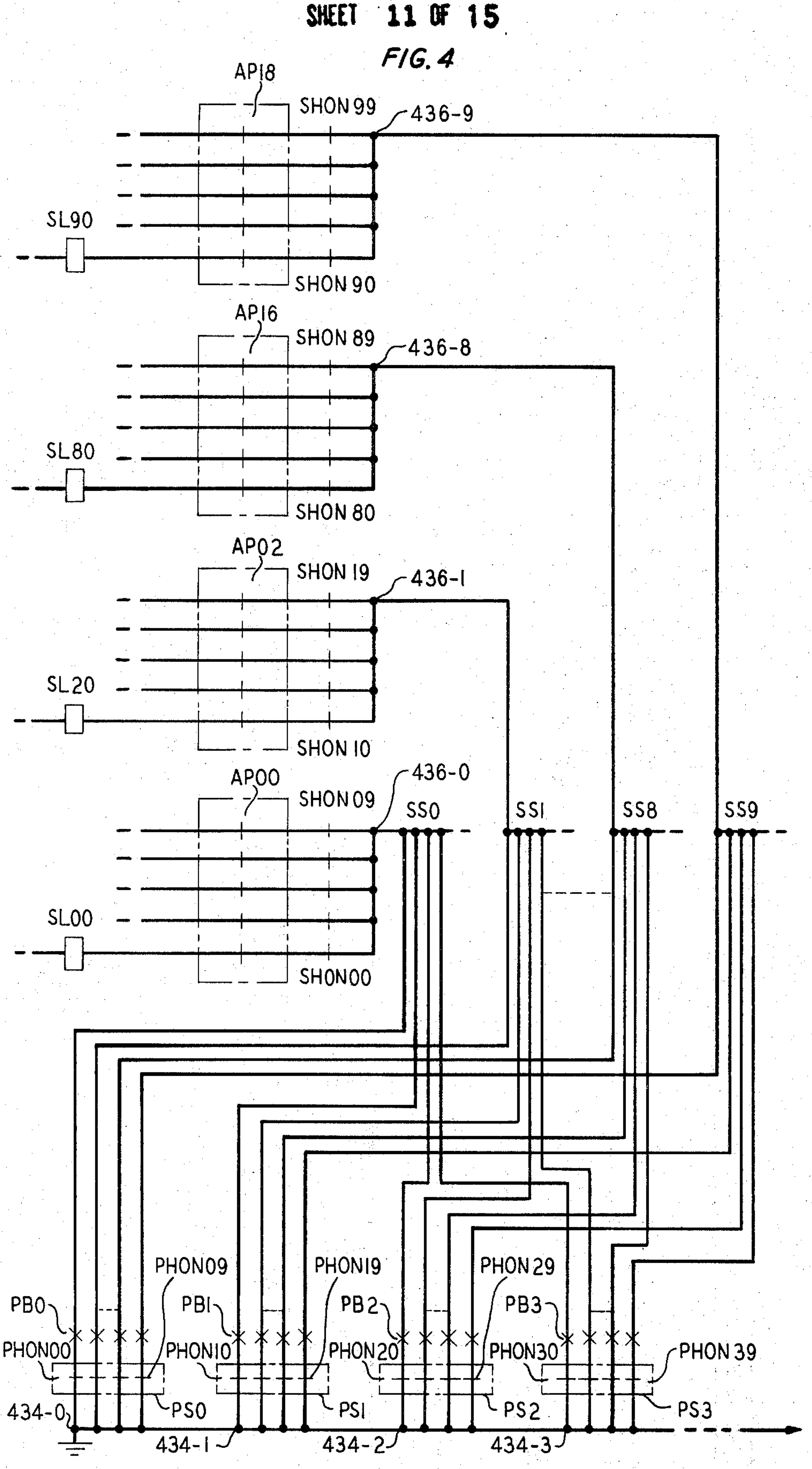

FIG. 4 discloses in simplified form the manner in which our path hunting and idle facility determining circuitry operates. On the bottom of the figure is shown a plurality of rectangles representing primary switches PS0 through PS3 together with the associated circuitry that generates the path hunting ground potentials in response to service requests. The upper portion of the figure shows a plurality of secondary switches, namely, switches 0, 1, 8, and 9, together with the first of the two attendant positions that is served by each secondary switch. Thus, secondary switch 0 is shown together with the circuit elements interconnecting this switch with attendant position circuit 00 (AP00). In a similar manner, attendant position circuit 02 is shown for secondary switch 1, attendant position circuit 16 is shown for secondary switch 8, and attendant position circuit 18 is shown for secondary switch 9. The rectangle representing each attendant position contains five break contacts that extend to the SL– relays associated with the position. Only the first of the five SL– relays for each position is shown in detail.

From an inspection of FIG. 4 it may be seen that when relay PB0 operates for primary switch 0, ground potentials are propagated over paths associated with idle verticals of the switch by means of the break contacts of the associated idle hold magnets. From there, these grounds are extended through make contacts of relay PB0 to the secondary switch to which each idle vertical of the primary switch is connected by means of the links. Thus, with respect to primary switch 0, if all of its hold magnets are released, a ground potential is extended to all secondary switches and, in turn, to each of terminals 436–0 through 436-9. From there, each ground is extended leftwards through the idle break contacts of all hold magnets of these switches and thence through the AP– break contacts of all idle positions, to the windings of the SL– relays of each idle loop circuit of each idle position to which an idle path is available from primary switch 0. The most preferred SL– relay operates and effects the establishment of a network connection between its loop and its attendant position from the bidding trunk circuit of primary switch 0 in the same manner as priorly described for FIG. 3.

Figure 5:
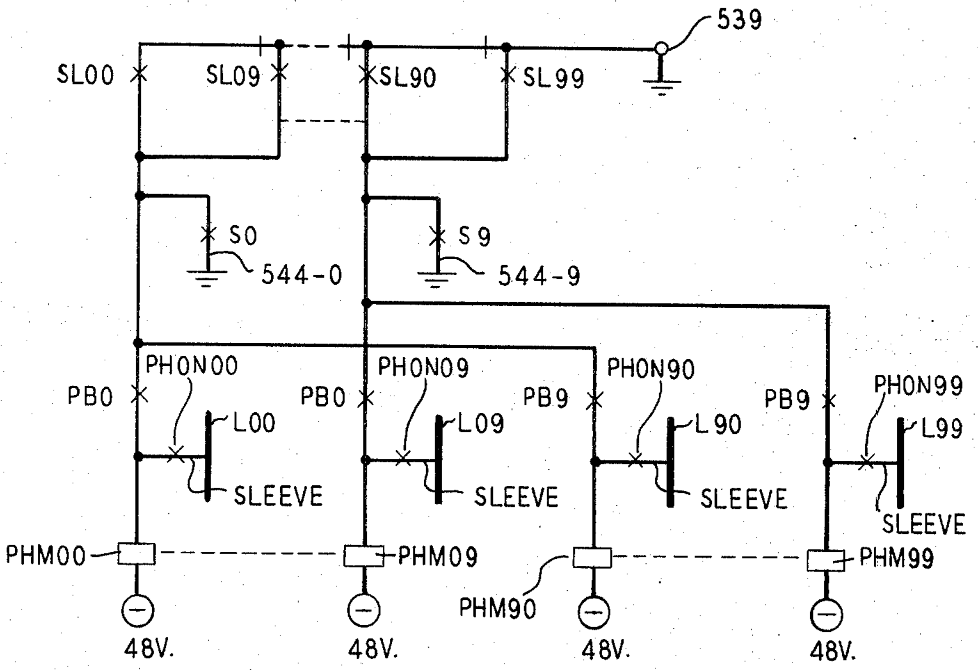

Description of FIG. 5

FIG. 5 discloses the details of the circuitry that operates the hold magnets of the primary switches. It has been described in connection with the preceding drawing figures how a connection is established from attendant trunk 00 to attendant position 00 via loop 00. In connection with the establishment of this connection, it is described how relay SL00 operates on FIG. 3 to select position 00 and loop 00.

With reference to FIG. 2B, the connection of attendant trunk circuit 00 to link L00 requires the operation of the select magnet for horizontal 00 and the hold magnet for vertical V00 of primary switch PS0. On FIG. 3 select magnet PSM00 for horizontal 00 operates in response to the service required from trunk circuit 00.

FIG. 5 discloses the primary switch hold magnets PHM00 through PHM99. Each of these hold magnets is associated with a corresponding one of verticals V00 through V99 for the primary switches of FIG. 2B. The operation of relay SL00 (when loop 00 and position 00 is selected) extends the terminal 539 ground through contacts SL00, through the make contacts of relay PB0 for the primary switch, to the winding of hold magnet PHM00. The operation of select magnet PSM00, together with the subsequent operation of hold magnet PHM00, closes the crosspoint common to vertical 00 and horizontal 00 on switch PS0 and thereby connect the trunk circuit to link L00. The operation of hold magnet PHM00 closes its OFF normal make contacts PHON00 to connect its winding to the sleeve lead of the connection over link L00. A ground on this sleeve lead from the calling trunk circuit maintains the network path in the conventional manner.

DESCRIPTION OF FIG. 6

Figure 6:
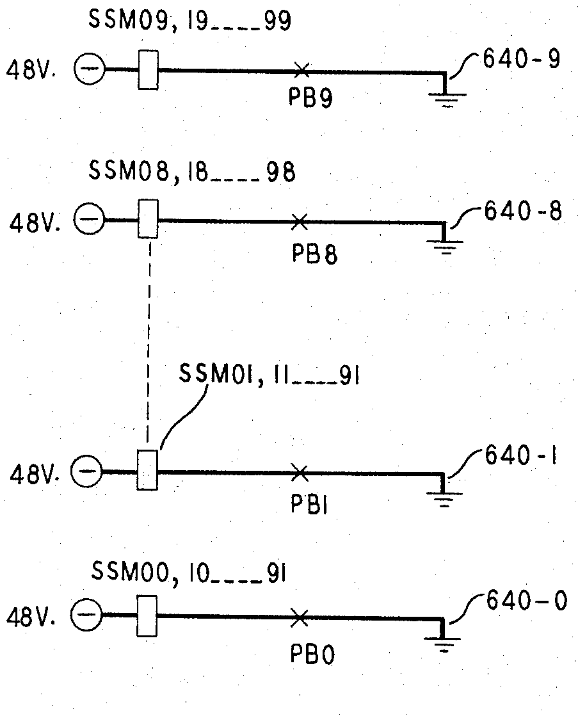

FIG. 6 describes the details of the circuitry that operates the select magnets of the secondary switches. From an inspection of FIG. 2 it may be seen that the establishment of a network connection from primary switch PS0 to any secondary switch requires the operation of the select magnet for the 0 or top level of the secondary switch. Thus, on FIG. 6, the operation of relay PB0 upon the receipt of a service request from one of the trunk circuits of primary switch PS0 extends the ground on terminal 640–0 through make contacts PB0 to the windings of the select magnets of level 0 of each secondary switch. The select magnet for level 0 of secondary switch 0 is designated SSM00; the corresponding select magnets for the other secondary switches are designated SSM10, SSM20 . . . through SSM90. All of these select magnets operate at this time when contacts PB0 close.

On FIG. 3A, the receipt by loop circuit 00 of a seizure signal on conductor 339–00 causes the loop circuit to operate its hold magnet SHM00 which locks over its OFF normal make contacts SHON00 to the ground on the sleeve lead for the connection. The path to operate each secondary hold magnet includes make contacts of relay SHMD on FIG. 3A. This relay operates after a brief delay from a terminal 370– ground on FIG. 3B whenever any of relays PB0–PB9 operate.

Th operation of select magnet SSM00 on FIG. 6 for secondary switch SS0 and the subsequent operation of hold magnet SHM00 on FIG. 3A closes the required crosspoints of switch SS0 on FIG. 2 to interconnect loop circuit -00 with link L00 and, in turn, through primary switch PS0 to attendant trunk circuit 00. The initial operation of the select magnets for primary switch PS0 and secondary switch SS0 followed by the operation of the appropriate hold magnets for the bidding trunk circuit and the selected loop circuit effects the required network connection between these two circuits. Upon the completion of this connection, the attendant at position 215-00 may serve the call in the conventional manner depending upon the service it requires.

DESCRIPTION OF FIG. 7

Figure 7:
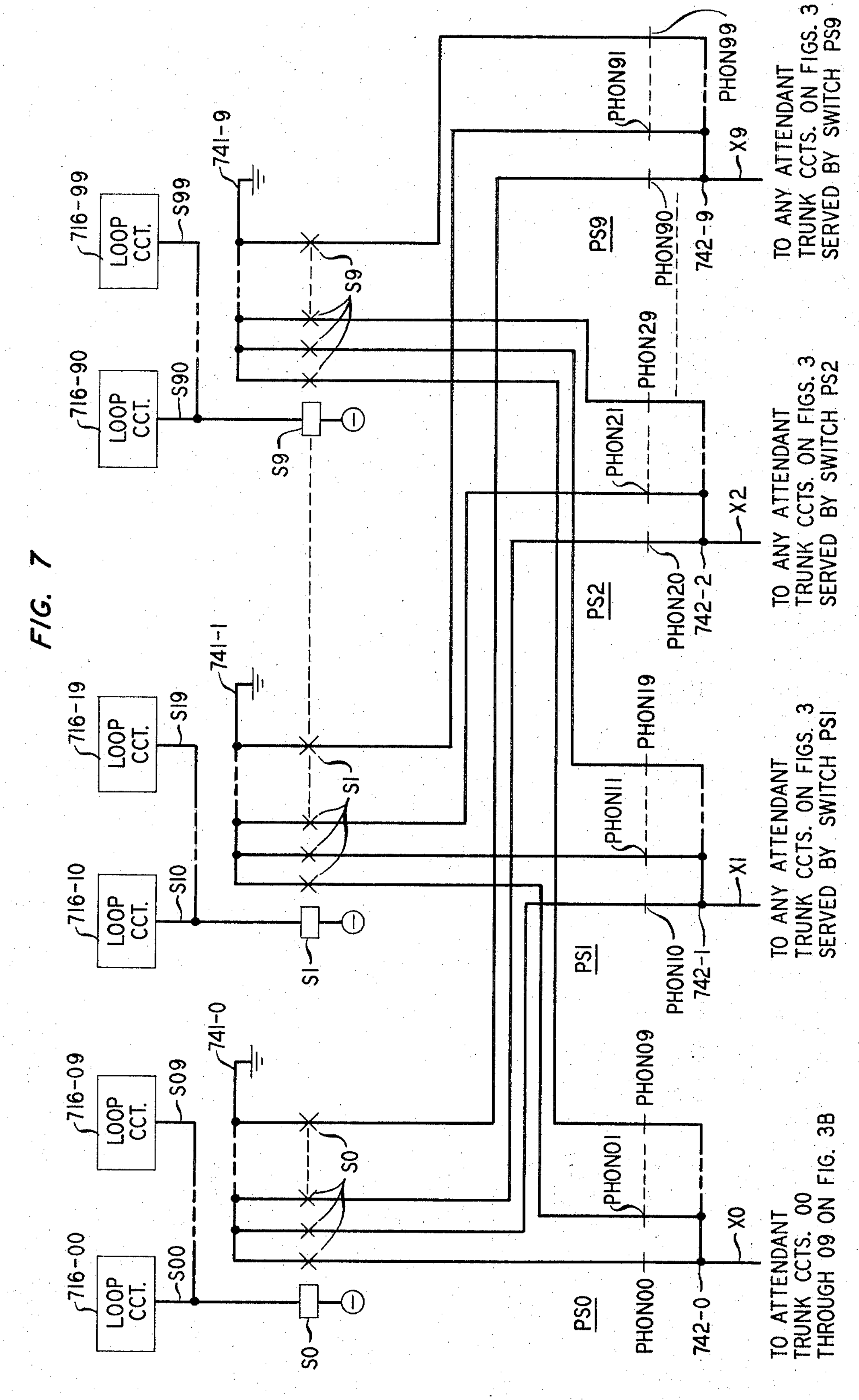
Figure 8A:
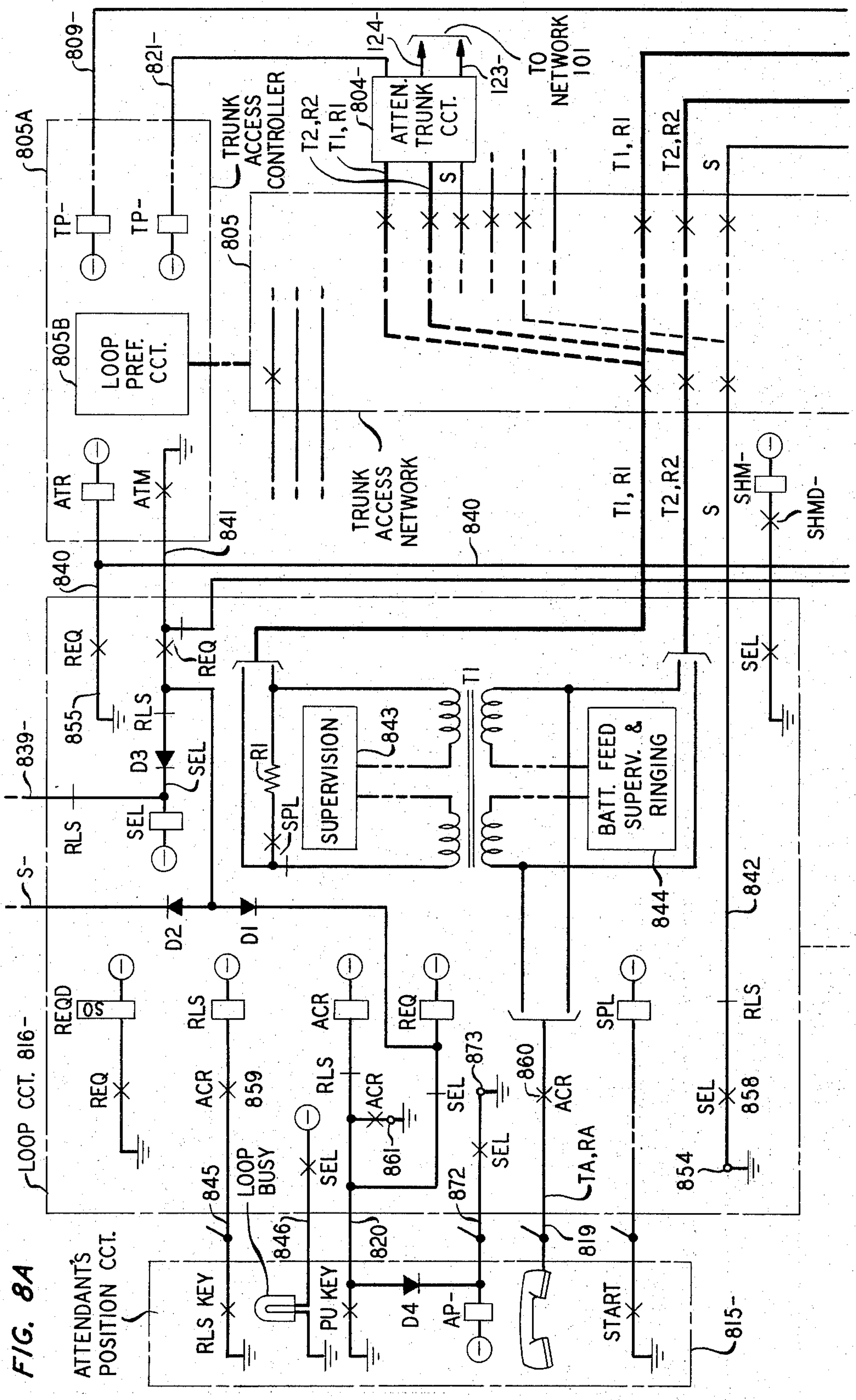
Figures 8B, 8C:
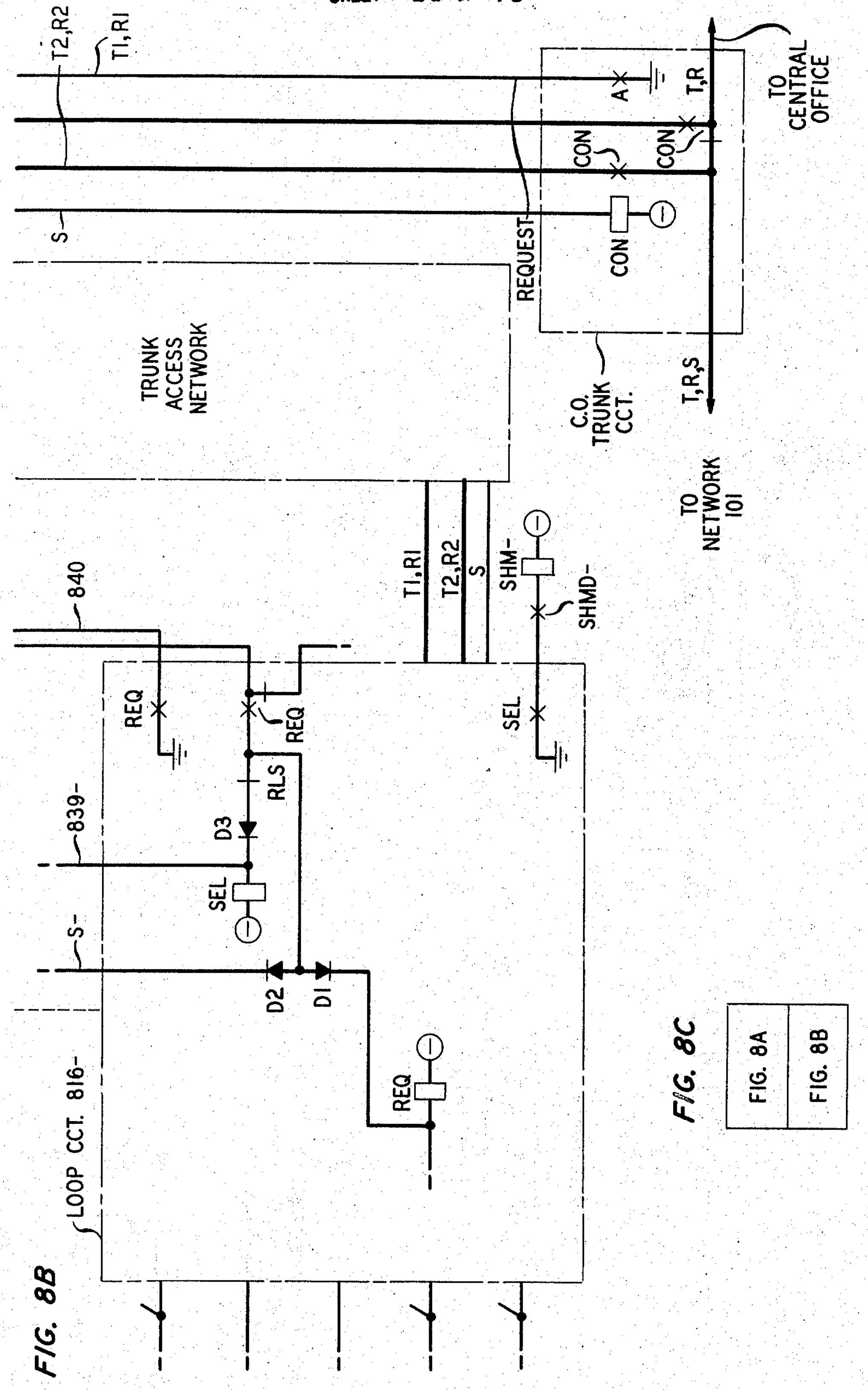

FIG. 7 discloses the details of the circuitry that effects the circuit operations required to establish a path from an attendant loop circuit to an attendant trunk circuit. In initiating such connections, the attendant typically selects an idle one of her five loop circuits and then depresses a key associated with the selected loop circuit. The loop circuit responds to the key depression and by means of the circuitry shown on FIG. 7 operates the associated S– relay for its secondary switch. Thus, for example, the seizure of loop circuit 00 operates relay S0 for secondary switch SS0. The operation of this relay extends the terminal 741– ground through its make contacts and over the indicated conductors to the bottom of FIG. 7 to the break contacts of the hold magnets of the primary switches.

Each hold magnet whose switch vertical is not currently busy on a connection is in a release state and thereby extends the path hunting ground from FIG. 7 to the attendant trunk circuits on FIG. 3 served by the primary switch of which the hold magnet is a part. For example, the operation of relay S0 closes its make contacts to extend the terminal 741-0 ground to primary switch PS0 where it is extended through the OFF normal break contacts PHON00 of the hold magnet of vertical 00 for the switch. From there, the ground is extended to terminal 742-0 from where it is further extended over conductor X0 to all attendant trunk circuits served by primary switch 0. On FIG. 2B all of the horizontals of primary switch 0 are connected to attendant trunk circuits, namely, attendant trunk circuits 00 through 09. This being the case, on FIG. 7 the ground on terminal 742-0 is extended over conductor X0 to all of attendant trunk circuits 00 through 09. This is shown on FIG. 3B where the details of attendant trunk circuit 00 are shown.

With reference to FIG. 7, the closure of the make contacts of relay S0 also extend grounds to the OFF normal contacts for the hold magnets of all other primary switches that serve attendant trunk circuits. The ground is propagated through the break contacts of all idle primary switch hold magnets and from there to all attendant trunk circuits served by each switch. If a switch, such as for example, switch 9, serves only central office trunk circuits, the ground that is propagated through the break contacts of the hold magnets for the switch proceed no further since, in the disclosed system, an attendant can initiate or request a connection only to an attendant trunk circuit and not to a central office trunk circuit. On the other hand, if a switch, such as for example, primary switch 1, services both attendant trunk circuits and central office trunk circuits, the ground that is propagated through the break contacts of the idle hold magnets of the switch would be extended on FIG. 3 only to the attendant trunk circuits and not to the central office or intraoffice trunk circuits of the system.

In order to describe in further detail the operation of the circuitry of our invention, let it be assumed that attendant trunk circuit 00 is seized in response to a request from loop circuit 00 at position 00. In this case, the terminal 741-0 ground is extended through the make contacts of relay S0, as it operates, and then through break contacts PHON00 to terminal 742-0. From there, the ground is extended over conductor X0 to FIG. 3B where it is extended through break contacts B00 within the trunk circuit and from there over conductor 321-00C to relay TP00 in the controller. This ground operates the TP00 relay in the same manner as for the connection request priorly described that was initiated by attendant trunk circuit 00.

The ground that is propagated through break contacts PHON00 on FIG. 7 is also extended to all other attendant trunk circuits served by primary switch 0. All such other trunk circuits of this switch that are currently idle operate their associated TP– relay in the controller at this time. However, the preference circuit comprising the transfer contacts of the TP– relays permits only the most preferred select magnet on the switch to operate at this time. Relay TP00 is most preferred and, therefore, its make contacts operate select magnet PSM00 at this time from ground on terminal 338B. This same ground is extended through diode D00 to operate relay PB0 which initiates the path hunting operations already described to establish a network connection from the attendant trunk circuit to the loop circuit initiating the request which, in this case, is assumed to be loop circuit 00.

The operation of relay PB0 operates the select magnet for level 0 of each secondary switch. This circuit is shown on FIG. 6 and it extends from ground on terminal 640-0 through the make contacts of relay PB0 to the winding of select magnet 0 on each secondary switch. On secondary switch PS0 (which serves loop 00) this select magnet is designated SM00. On FIG. 5, the operation of relays S0 and PB0 complete a path from ground on terminal 539 to operate the hold magnet PMM00 for vertical V00 of primary switch 0. This completes a path shown on FIG. 2A and 2B between attendant trunk circuit 00 and link L00 extending from primary switch PS0 to secondary switch SS0. Hold magnet PHM00 in operating completes a holding path for itself over its make contacts PHON00 to the sleeve lead of the completed connection.

It has already been described how select magnet SSM00 for horizontal 0 of secondary switch SS0 is operated by the circuit of FIG. 6 when relay PB0 operates. On FIG. 3A, the operation of relay PB0 closes a path to operate relay SHMD. The pickup request circuitry of the loop circuit applies a ground to its conductor 345-00 whenever the attendant attempts to seize the loop circuit and request a connection to an attendant trunk circuit. The ground on conductor 345-00 is extended through make contacts of relay SHMD after it operates and from there is extended to the winding of the hold magnet SHM00 which serves vertical 0 of secondary switch SS0. The operation of this hold magnet completes the establishment of the network connection between loop circuit 00 and attendant trunk circuit 00.

The attendant trunk circuits and the controller contain circuitry that removes the service request signal and release the select magnets after a network connection is established.

DESCRIPTION OF FIG. 8

FIG. 8 illustrates further details of our invention and, in particular, further details of a loop circuit as well as the elements in the position circuits and the trunk circuits that communicate signalwise with the loop circuits. The various elements on FIG. 8 are designated in a manner that facilitates their correspondence with the same elements on other drawing figures. For example, network 805 corresponds to network 105 on FIG. 1 and to network 205 on FIG. 2.

The circuitry of our invention is effective to establish a network path between a loop circuit and an attendant trunk circuit in response to a request from either circuit. Connections between a loop circuit and a central office trunk circuit are established only in response to requests from the trunk circuits. An attendant trunk circuit request is received by the controller over one of conductors 821–. A central office trunk circuit request is received over one of conductors 809–. Each request operates the TP- relay in the controller that is associated with the requesting trunk circuit. A loop circuit request is received by he controller over conductor 840 to operate relay ATR.

By means of preference circuitry, whose details are not required for an understanding of the present invention, the controller receives the various types of service requests, some of which may be received simultaneously, and serves these requests in an ordered manner. On FIG. 3, relay TLM is associated with the requests from the trunk circuits; relay ATM is associated with the requests from the attendant positions. The service preference circuitry of the controller determines which type of request will be served at each instant of time and operates either the ATM or TLM relay depending upon the type of the request that is to be served.

Let it first be assumed that the CO trunk circuit on the lower right-hand corner of FIG. 8 receives an incoming call that requires a connection to an attendant position. In this case, the trunk circuit closes the A contacts (of its relay A whose winding is not shown) to ground conductor 809–. This operates the associated TP– relay in the controller which, in turn, establishes a path between the trunk circuit and an idle loop circuit, such as the loop circuit whose details are shown on the left side of FIG. 8.

In serving this request, the controller operates the SL- preference relays on FIG. 3 for the selected loop circuit and applies a ground to its 339– conductor. This conductor is shown as conductor 839– on FIG. 8 where it extends to the winding of relay SEL of the loop circuit to operate it. The operation of this relay closes its make contacts to light the loop busy lamp at the position as an indication to the attendant that a call is extended to this loop. Make contacts 858 of the SEL relay operate to extend the terminal 854 ground through the break contacts of relay RLS to sleeve conductor 842. This ground extends over the sleeve lead, through the network, to operate relay CON in the CO trunk circuit. The operation of this relay closes its transfer make contacts to extend the speech paths of the trunk circuit through the network 805 to the conductor pairs T1, R1 and T2, R2 of the loop circuit. The T1, R1 pair is connected to the supervision circuit 843 via transformer T1.

When the attendant answers the call, she operates the PU key which applies a ground to conductor 820. This ground operates relay ACR through the break contacts of relay RLS; the operation of relay ACR closes a holding path for itself through its own make contacts and the break contacts of relay RLS to ground on terminal 861. Relay REQ does not operate at this time since relay SEL is currently operated and its break contacts are open. Relay ACR in operating closes its make contacts 860 to connect the operator's headset with the T1, R1 and T2, R2 conductor pairs. Make contacts 859 of relay ACR prepare a path for operating relay RLS when the operator subsequently depresses the RLS key to release from the call.

In order to extend the call to the called PBX station, the operator depresses the start key and performs the required dialing operations. This initiates the system operations required to establish a path between the network 101 appearance of the CO trunk circuit and the called PBX station. The manner in which these system operations are performed comprise no portion of our invention and, therefore, they are not described in further detail.

The depression of the start key also operates relay SPL in the loop circuit. This relay closes its make contacts when it operates to provide a T1, R1 holding path for the central office side of the connection while, at the same time, permitting the attendant to talk with the called station over the T2, R2 path extending to the CO trunk circuit and from there through network 101.

Let it be assumed that no further operator assistance is required after the connection is established to the called station. In this case, the operator depresses the RLS key which grounds conductor 845 and operates relay RLS. The operation of this relay opens its break contacts to release relay SEL. The release of relay SEL extinguishes the loop busy lamp and, with the operation of relay RLS, removes the ground from the sleeve conductor 842 to release relay CON in the CO trunk circuit. The release on relay CON releases its transfer make contacts and closes its transfer break contacts. This disconnects the speech path of the trunk circuit from the attendant position and connects the two ends of the trunk circuit speechwise with each other so that the calling and called parties may converse. Since conductor 842 is the sleeve lead for the network connection, the removal of ground from this conductor releases the network 805 connection between the loop circuit and the CO trunk circuit.

The operation of relay RLS in the loop circuit also opens its break contacts to release relay ACR. This opens the make contacts 860 of relay ACR to disconnect the position speechwise from the loop circuit and to free the position to serve calls on either this or another one of its loop circuits.

In a manner similar to that described for an incoming call on a CO trunk circuit, a station may dial the attendant, seize an attendant trunk circuit, and request an attendant to establish an outgoing call. In this case, the sequence of operations in the loop circuit and the attendant trunk circuit are analogous to that just described for the CO type call.

The following describes the operation of the circuitry of FIG. 8 for an attendant originated connection to an attendant trunk circuit. The attendant seizes an idle loop circuit by depressing the PU key for the loop. Let it be assumed that the loop that is seized is the one shown in detail on FIG. 8. This being the case, the operation of the PU key grounds conductor 820 to operate relays ACR and REQ. The operation of relay ACR closes its make contacts 860 to interconnect the attendant speech circuitry with the transmission circuitry of the loop circuit; it also closes its make contacts 859 to connect the RLS key of the position with relay RLS. The operation of relay REQ closes its make contacts to apply ground from terminal 855 to conductor 840 to operate relay ATR in the controller. Relay ATR operates relay ATM on FIG. 3 and initiates the sequence of circuit actions required to establish a network path between the requesting loop circuit and an idle one of the attendant trunk circuits. The operation of relay ATM closes its make contacts to apply ground to conductor 841. This ground is extended through the make contacts of relay REQ, the break contacts of relay RLS, diode D3, to the winding of relay SEL to operate it. This ground is also extended through the same make contacts of relay REQ, through diode D2, and applied to the S– lead. This S– lead corresponds to the various S– leads on FIG. 7 and it operates the S– relay associated with the requesting loop circuit such as, for example, relay S0 for loop circuit 00. The operation of relay S0, in turn, initiates the path hunting operations already described to find and establish a path from the bidding loop circuit to an idle attendant trunk circuit. This same ground from the contacts of relay REQ is also extended through diodes D1 to hold relay REQ operated when relay SEL operates and opens its break contacts which are connected to the winding of relay REQ.

The operation of relay SEL lights the loop busy lamp and applies a sleeve lead ground from terminal 854 to conductor 442, through break contacts of relay RLS, to operate relay CON (not shown) of the attendant trunk circuit. The operation of relay CON of the attendant trunk circuit connects the speech circuitry of the loop circuit to the trunk circuit. Since the attendant initiated this connection, she may now either establish a call to a PBX station or, alternatively, she may establish a connection to a central office via a CO trunk circuit. The operator effects or initiates these operations by depressing the start key at her position and by then performing the dialing operations required to establish the desired connection. The manner in which these connections are established by the system comprises no portion of our invention and is, therefore, not described in further detail.

Each position includes an AP– – relay that is operated only when the position is busy on a call. On FIG. 8A the AP– – relay operates from ground through the PU key as well as over conductor 872 from make contacts SEL of any loop circuit connected to the position. The break contacts of the AP– – relays on FIGS. 3 and 4 are in the portion of the path hunting circuitry that determines whether each position is idle or busy.

It is possible that a plurality of attendants may simultaneously operate their PU keys to initiate a request to an idle attendant trunk circuit. The preference circuit shown on FIG. 8 comprising the transfer contacts of relay REQ permit the system to honor or respond or serve only one such request at a time. The operation of relay REQ in any one of the bidding loop circuits closes its make contacts to ground conductor 840 and operate relay ATR in the controller. The make contacts of relay ATM close and apply a ground to one end of the REQ relay preference chain of which the top-most loop circuit is first preferred and with the remaining ones of the loop circuits being next preferred. For example, the ground to operate relay SEL of the top-most loop circuit extends from the make contacts of relay ATM, through make contacts of the REQ relay of the top-most loop circuit, and from there through break contacts RLS and diode D3 to the winding of relay SEL. When the REQ relay of this loop circuit operates, the ATM relay ground cannot be extended downward on FIG. 8 to operate the SEL relay of any other loop circuit. However, if the top-most loop circuit is idle when a request is received from another loop circuit, the ground on the make contacts of relay ATM may be extended down through the break contacts of Relay REQ for the top-most loop circuit of FIG. 8 to the next loop circuit. If this next loop circuit is the requesting one, its relay REQ is currently operated and this permits its SEL relay to operate in the manner similar to that already described for the first loop circuit. If the second loop circuit is not the requesting one and is idle, the ground may be further extended downwards to operate the relay SEL of the requesting loop circuit provided that no priorly preferred loop circuit has its REQ relay operated at the time.

It should be appreciated that certain aspects of the disclosed system have been simplified in order to facilitate an understanding of our invention. Particularly, with reference to FIG. 2, the relationship between loop circuits, network switches, and trunk circuits has been simplified to facilitate an understanding of our path hunting and connection establishing circuitry. For example, the five loop circuits of the first and second positions are shown as being served by the ten verticals of secondary switch SS0. In actual practice and in accordance with well-known network blocking theory, the five positions of each loop circuit would not be connected to successive verticals of the same switch but, in all probability, would be connected to a different vertical of different secondary switches in order to minimize blocking and to permit an attendant to obtain a connection to any trunk circuit.

What is claimed is:

1. A communication switching network, a plurality of circuits connected to appearances on said network, means in each of said circuits for requesting a network connection to another one of said circuits, means effective upon the generation of a request by any one of said circuits for propagating a signal through idle state determining means associated with idle network paths extending from the requesting one of said circuits, means for further propagating said signal from said path idle state determining means and through idle state determining means of idle ones of said circuits to which a connection is requested, and means responsive to the propagation of said signal through said last named determining means for establishing a network connection from said requesting circuit to one of said idle circuits.

2. The invention of claim 1 wherein said idle state determining means of said paths comprises contacts associated with network paths extending from any requesting one of said circuits to others of said circuits, and wherein said idle state determining means of said circuits comprises contacts unique to each of said circuits for extending said signal therethrough whenever a circuit associated with any of said contacts is in an idle state.

3. In combination, a network and a network controller, circuits connected to each side of said network, means in each of said circuits for generating a request for a network connection to one of said circuits on the other side of said network, means including said controller responsive to the generation of a request by any requesting one of said circuits for propagating a signal through contacts associated with idle network paths extending from said one requesting circuit to the other side of said network, means for further propagating said signal from said idle path contacts through contacts associated with idle ones of said circuits connected to said idle paths on said other side of said network, means for applying said signal from said idle circuit contacts to said controller, and means responsive to the reception of said signals by said controller for establishing a network connection from said one requesting circuit to an idle one of said circuits whose contacts apply said signal to said controller.

4. In a switching system having a multistage network and a network controller, idle state determining means for each path extending between the stages of said network, circuits connected to each stage of said network, means in each of said circuits for generating a request for a network connection to an idle one of said circuits connected to the other stage of said network, means including said controller responsive to the generation of a request by any requesting one of said circuits for propagating a signal through the idle state determining means of each network path extending from the stage of said one requesting circuit to the other stage of said network, means for further propagating said signal through idle state determining means associated with idle paths of said other stage extending from said first stage and through said other stage to said circuits connected to said other stage, means for extending said signal through each of said last named circuits currently in an idle state to said controller, and means responsive to the reception of said signals by said controller for establishing a network connection from said one requesting circuit to an idle one of said circuits that extends said signal to said controller.

5. The system of claim 4 in combination with a plurality of matrix type switches in each of said stages with each switch having two sets of coordinate conductors, said circuits of each stage being connected to one set of the coordinate conductor of the switches of the stage, and link conductors extending between said stages and interconnecting the other set of coordinate conductors of the switches of each stage.

6. The system of claim 5 in which said idle state determining means comprises contacts associated with each idle switch path between a requesting circuit and a circuit connected to switches on the other stage of said network from said requesting circuit.

7. The system of claim 6 in which said system further comprises, a control magnet for each coordinate conductor of each switch, means including said establishing means for activating the control magnets associated with the network path extending from said requesting circuit to said one idle circuit on said other stage of said network, and means responsive to the activation of said magnets for interconnecting the switch conductors required to establish said connection between said two last named circuits.

8. In a switching system having a multistage network, said network having a line side stage and a trunk side state, a network controller, a plurality of switches in each of said stages, paths connecting each line side switch with each trunk side switch, a plurality of circuits connected to each of said switches, means in each of said circuits for requesting a network connection to any idle one of said circuits on the other side of said network, means for applying a connection request from any requesting one of said circuits to said controller, means responsive to the reception of a request by said controller for extending a signal through idle path contacts of the switch connected to said requesting circuit, means for further extending said potential over all idle paths of said network extending from said contacts to contacts of switches connected to said idle paths on said other side of said network, means for extending said signal from said last named contacts to the ones of said circuits connected to said other side switches to which said idle paths are connected, means for extending said signal through idle ones of said last named circuits to said controller, and means responsive to the reception of said signals by said controller for establishing a network connection from said one requesting circuit to an idle one of said circuits that extends said signal to said controller.

9. In a switching system having a multistage network, said network having a line side stage and a trunk side stage, a network controller, link paths connecting said line side stage with said trunk side stage, a plurality of circuits connected to each of said stages, means in each of said circuits for generating a request for a network connection to any one of said circuits on the other side of said network, means for applying each connection request from any requesting one of said circuits to said controller, means responsive to the reception of a request by said controller for propagating a signal through idle state determining means associated with idle paths of the stage connected to said one requesting circuit and over idle link paths extending to said other network stage, means for further extending said signal through idle state determining means associated with idle paths of said other stage, means for extending said signal from said idle state determining means associated with idle paths of said other stage to the ones of said circuits connected to said other stage and associated with said idle paths, means for extending said signal through idle ones of said last named circuits to said controller for establishing a network connection from said one requesting circuit to an idle one of said circuits that extends said signal to said controller.

10. A multistage network having a line side stage and a trunk side stage, a network controller, a plurality of switches in each of said stages, at least one link path connecting each line side switch with each trunk side switch, service circuits connected to each of said switches, means in each of said circuits for generating a request for a network connection to any of said circuits on the other side of said network, means for applying each connection request from any requesting one of said circuits to said controller, means responsive to the reception of a request by said controller for propagating a signal over an idle state indicator of each idle network path including said links extending from the switch connected to said one requesting circuit to switches on the other side of said network, means for further extending said signal from said links and through an idle state indicator of each idle path of switches on said other side of said network to the ones of said circuits that are connected to said last named switches, means for extending said signal through idle ones of said last named circuits to said controller, and means responsive to the reception of said signals by said controller for establishing a network connection from said one requesting circuit to one of said last named circuits that extends said signal to said controller.

11. The method of controlling a multistage switching network in the establishment of connections between circuits connected to appearances on said network, said method comprising the steps of 1. receiving a request for the establishment of a network connection between the appearance of a requesting one of said circuits on one of said stages and the appearance of an idle one of said circuits on another of said stages,
2. propagating a signal through an idle state indicator of each idle network path extending from the network appearance of said requesting circuit to the network appearance of a circuit to which a connection is requested,
3. extending said signal from said indicator to said last named circuit,
4. further extending said signal through an idle state indicator of said last named circuit to a network controller,
5. establishing a path between said one requesintg circuit and said last named cirlcuit upon the receipt of said signal by said controller.

* * * * *